US012645615B2

(12) United States Patent
Foo et al.

(10) Patent No.: US 12,645,615 B2
(45) Date of Patent: Jun. 2, 2026

(54) RING BUFFER STORAGE METHOD AND RING BUFFER STORAGE SYSTEM CAPABLE OF MINIMIZING EXTRA OVERHEAD UTILIZATION

(71) Applicant: MediaTek Singapore Pte. Ltd., Singapore (SG)

(72) Inventors: Jung Hau Foo, Singapore (SG); Jia Yao Christopher Lim, Singapore (SG); Deep Yap, Singapore (SG); Kelvin Kae Wen Teh, Singapore (SG)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 18/935,642

(22) Filed: Nov. 3, 2024

(65) Prior Publication Data

US 2025/0147905 A1 May 8, 2025

Related U.S. Application Data

(60) Provisional application No. 63/595,774, filed on Nov. 3, 2023.

(51) Int. Cl.
| | |
|---|---|
| *G06F 13/16* | (2006.01) |
| *G06F 5/01* | (2006.01) |
| *G06F 12/0871* | (2016.01) |

(52) U.S. Cl.
CPC ............ *G06F 13/1673* (2013.01); *G06F 5/01* (2013.01); *G06F 12/0871* (2013.01)

(58) Field of Classification Search
CPC ............ G06F 13/1673; G06F 12/0871; G06F 12/0246; G06F 16/3329; G06F 2212/1024; G06F 2212/7201; G06F 2212/7204; G06F 2212/7208; G06F 2212/7211
USPC ......................................................... 711/118
See application file for complete search history.

(56) References Cited

U.S. PATENT DOCUMENTS

| | | | |
|---|---|---|---|
| 2024/0362422 A1* | 10/2024 | Callegari | ................ G06F 40/40 |
| 2024/0394400 A1* | 11/2024 | Smith | ................. G06F 21/6227 |
| 2025/0061316 A1* | 2/2025 | Gobriel | .................. G06N 3/045 |

* cited by examiner

*Primary Examiner* — Hashem Farrokh
(74) *Attorney, Agent, or Firm* — Winston Hsu

(57) ABSTRACT

A ring buffer storage method includes generating data of a first output according to Q input tokens of a large language model (LLM), and writing the data of the first output into last Q column vectors of an updated first cache tensor buffer matrix. A starting memory address of a first cache tensor buffer is shifted according to the number Q of input tokens of the LLM for updating the first cache tensor buffer. The first cache tensor buffer forms a first cache tensor buffer matrix. The updated first cache tensor buffer forms the updated first cache tensor buffer matrix. The first cache tensor buffer matrix includes a plurality of space segments. Each row of the first cache tensor buffer matrix includes C space segments. C is a cache size. The plurality of space segments have continuous memory addresses.

20 Claims, 13 Drawing Sheets

Figure 2:
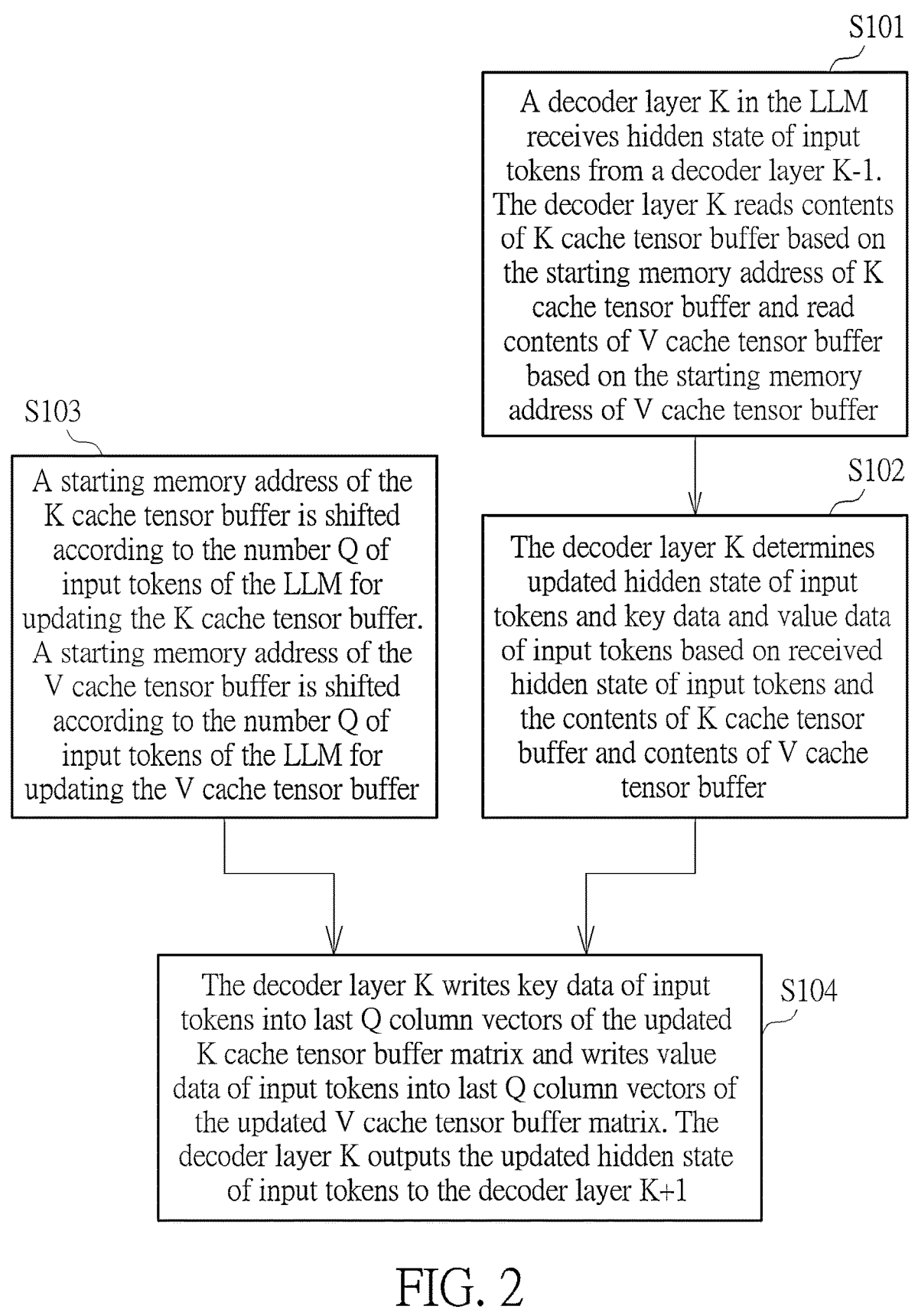

S101

A decoder layer K in the LLM receives hidden state of input tokens from a decoder layer K-1. The decoder layer K reads contents of K cache tensor buffer based on the starting memory address of K cache tensor buffer and read contents of V cache tensor buffer based on the starting memory address of V cache tensor buffer

S103

A starting memory address of the K cache tensor buffer is shifted according to the number Q of input tokens of the LLM for updating the K cache tensor buffer. A starting memory address of the V cache tensor buffer is shifted according to the number Q of input tokens of the LLM for updating the V cache tensor buffer

S102

The decoder layer K determines updated hidden state of input tokens and key data and value data of input tokens based on received hidden state of input tokens and the contents of K cache tensor buffer and contents of V cache tensor buffer The decoder layer K writes key data of input tokens into last Q column vectors of the updated K cache tensor buffer matrix and writes value data of input tokens into last Q column vectors of the updated V cache tensor buffer matrix. The decoder layer K outputs the updated hidden state of input tokens to the decoder layer K+1

Data of a first output according to Q input tokens of the LLM is generated ∽S1201

A starting memory address of a first cache tensor buffer is shifted according to the number Q of input tokens of the LLM for updating the first cache tensor buffer ∽S1202

The data of the first output is written into last Q column vectors of the updated first cache tensor buffer matrix ∽S1203

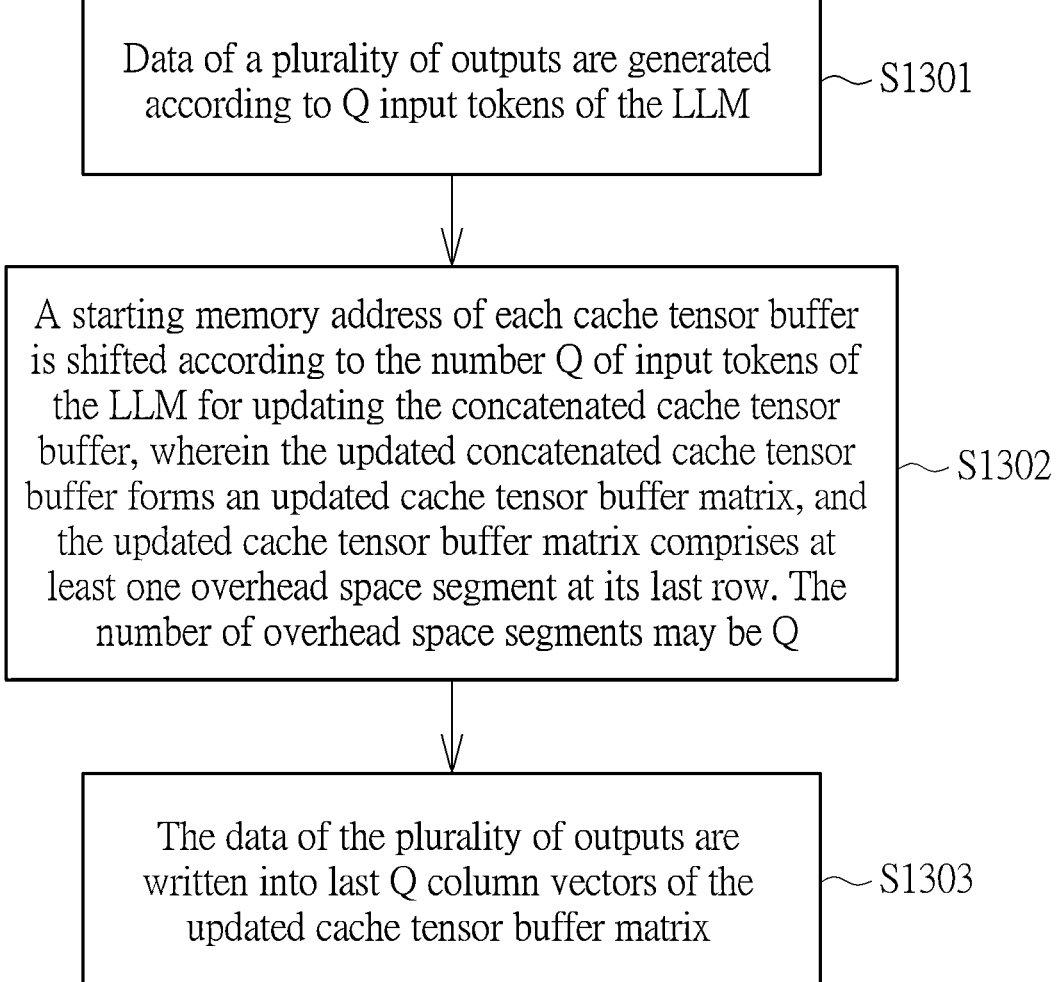

Data of a plurality of outputs are generated according to Q input tokens of the LLM ~S1301

A starting memory address of each cache tensor buffer is shifted according to the number Q of input tokens of the LLM for updating the concatenated cache tensor buffer, wherein the updated concatenated cache tensor buffer forms an updated cache tensor buffer matrix, and the updated cache tensor buffer matrix comprises at least one overhead space segment at its last row. The number of overhead space segments may be Q ~S1302

The data of the plurality of outputs are written into last Q column vectors of the updated cache tensor buffer matrix ~S1303

FIG. 13

RING BUFFER STORAGE METHOD AND RING BUFFER STORAGE SYSTEM CAPABLE OF MINIMIZING EXTRA OVERHEAD UTILIZATION

CROSS REFERENCE TO RELATED APPLICATIONS

This application claims the benefit of U.S. Provisional Application No. 63/595,774, filed on Nov. 3, 2023. The content of the application is incorporated herein by reference.

BACKGROUND

Large Language models (LLMs), particularly those employing transformer decoders, often demand significant memory due to their reliance on past token information for predicting subsequent tokens. To expedite inference, a common optimization technique involves implementing key/value (K/V) caching, eliminating the need for repetitive key and value re-computations of previously processed tokens.

During the LLM inference, new K/V values are generated and written into K/V cache buffer. To efficiently manage this cache buffer, a software-based ring buffer mechanism can be employed. K/V values of the current model is stored in the ring buffer. Ideally, the ring buffer should be at least twice the size of the model input cache to allow the model to fully utilize the cache without incurring ring buffer reset overhead. For instance, a model capable of accessing previous 20 tokens would necessitate a ring buffer of at least 40 tokens of memory spaces.

Therefore, given the substantial memory requirements of LLMs, developing a ring buffer capable of minimizing additional memory overhead is crucial.

SUMMARY

In an embodiment of the present invention, a ring buffer storage method is disclosed. The ring buffer storage method comprises generating data of a first output according to Q input tokens of a large language model (LLM); and writing the data of the first output into last Q column vectors of an updated first cache tensor buffer matrix, wherein a starting memory address of a first cache tensor buffer is shifted according to the number Q of input tokens of the LLM for updating the first cache tensor buffer, wherein the first cache tensor buffer forms a first cache tensor buffer matrix, the updated first cache tensor buffer forms the updated first cache tensor buffer matrix, the first cache tensor buffer matrix comprises a plurality of space segments, each row of the first cache tensor buffer matrix comprises C space segments, and C is a cache size, wherein the plurality of space segments have continuous memory addresses, a starting address of each row of the first cache tensor buffer matrix is continuous with an ending address of the previous row of the first cache tensor buffer matrix, and the updated first cache tensor buffer matrix comprises at least one overhead space segment at its last row.

In an embodiment of the present invention, a ring buffer storage method is disclosed. The ring buffer storage method comprises generating data of a plurality of outputs according to Q input tokens of a large language model (LLM), wherein each output corresponds to one cache tensor buffer, and the plurality of outputs correspond to a plurality of cache tensor buffers, and the plurality of cache tensor buffers have continuous addresses and forms a concatenated cache tensor buffer, the concatenated cache tensor buffer forms a cache tensor buffer matrix; the cache tensor buffer matrix comprises a plurality of space segments, each row of the cache tensor buffer matrix comprises C space segments, and C is a cache size, a starting address of each row of the cache tensor buffer matrix is continuous with an ending address of the previous row of the cache tensor buffer matrix, and writing the data of the plurality of outputs into last Q column vectors of an updated cache tensor buffer matrix, wherein a starting memory address of each cache tensor buffer is shifted according to the number Q of input tokens of the LLM for updating the concatenated cache tensor buffer, wherein the updated concatenated cache tensor buffer forms an updated cache tensor buffer matrix, and the updated cache tensor buffer matrix comprises at least one overhead space segment at its last row.

In another embodiment of the present invention, a ring buffer storage system is disclosed. The ring buffer storage system comprises a ring buffer and a processor coupled to the ring buffer. The processor generates data of a first output according to Q input tokens of a large language model (LLM), and writes the data of the first output into last Q column vectors of an updated first cache tensor buffer matrix, wherein a starting memory address of a first cache tensor buffer is shifted according to the number Q of input tokens of the LLM for updating the first cache tensor buffer, wherein the first cache tensor buffer forms a first cache tensor buffer matrix, the updated first cache tensor buffer forms the updated first cache tensor buffer matrix, the first cache tensor buffer matrix comprises a plurality of space segments, each row of the first cache tensor buffer matrix comprises C space segments, and C is a cache size, wherein the plurality of space segments have continuous memory addresses, a starting address of each row of the first cache tensor buffer matrix is continuous with an ending address of the previous row of the first cache tensor buffer matrix, and the updated first cache tensor buffer matrix comprises at least one overhead space segment at its last row.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 illustrates a schematic diagram of performing a ring buffer storage method for a large language model according to an embodiment of the present invention.

FIG. 13 illustrates a flow chart of performing a ring buffer storage method by the ring buffer storage system in FIG. 1A or FIG. 1B.

DETAILED DESCRIPTION

In auto-regressive systems like GPT (Generative Pre-trained Transformer) and other Transformer-based architectures, at least one token from the input sequence may be first converted into a hidden state which is associated with the at least one token and contains basic information about the at least one token. Then, the hidden state is processed through multiple transformer layers of the system. In the architecture of the disclosed system, each transformer layer incorporates an attention or self-attention mechanism that updates the hidden state of input tokens. This multi-layer processing ensures that the final output is informed by a comprehensive and nuanced understanding of the entire input sequence, leading to more accurate and contextually relevant results.

Figure 1A:
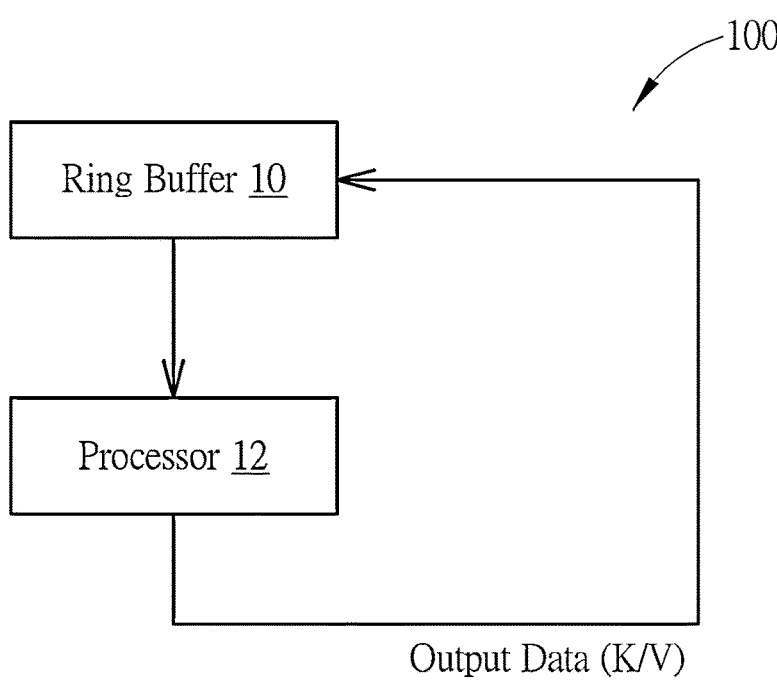
FIG. 1A illustrates a block diagram of a ring buffer storage system for a large language model according to an embodiment of the present invention.
Figure 1B:
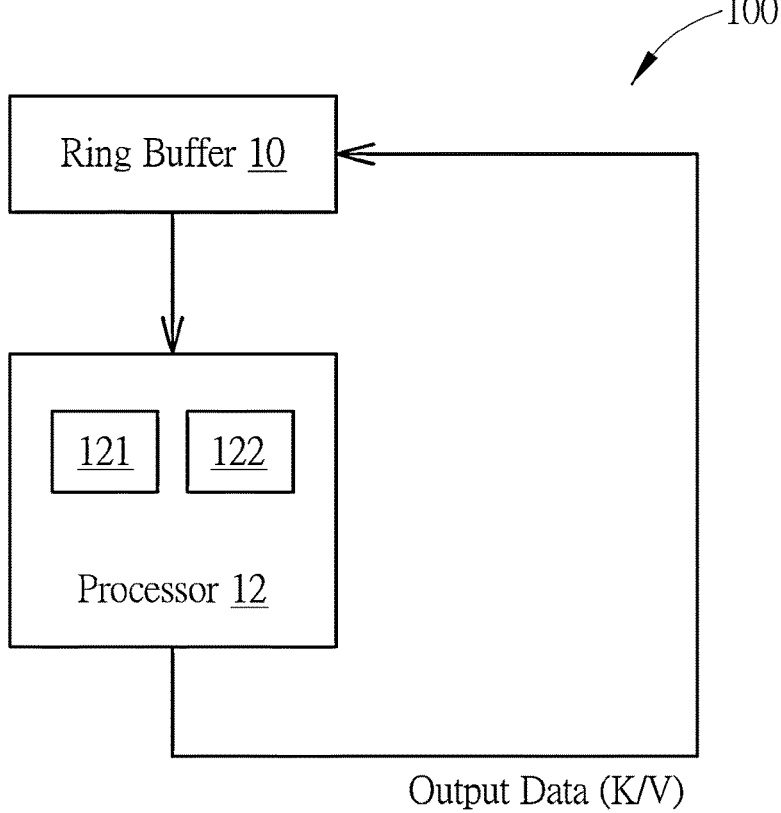
FIG. 1B illustrates another block diagram of the ring buffer storage system for the large language model according to an embodiment of the present invention.

FIG. 1A illustrates a block diagram of a ring buffer storage system 100 for a large language model (LLM) according to an embodiment of the present invention. FIG. 1B illustrates another block diagram of the ring buffer storage system 100 for the LLM according to an embodiment of the present invention. The ring buffer storage system 100 can be used for updating key data and value data of input tokens of the LLM within an auto-regressive mechanism, such as for a transformer-based LLM. Here, the LLM can be a type of Artificial Intelligence (AI) that can process and generate human language. For example, the LLM based on a neural network can perform an attention mechanism or a self-attention mechanism. In FIG. 1, the ring buffer storage system 100 includes a ring buffer 10 and a processor 12. The processor 12 is coupled to the ring buffer 10. Particularly, LLM may be a software and runs on the processor 12. In one embodiment, the processor 12 may comprise a processor 121 and a processor 122, as shown in FIG. 1B, wherein processor 121 and the processor 122 are separate. In FIG. 1B, the LLM may run on the processor 121. The processor 122 can execute a software program to determine read/write memory addresses of the ring buffer 10. The LLM can perform read/write operations based on read/write memory addresses of the ring buffer 10. In another embodiment, the processor 12 is one processor, as shown in FIG. 1A. The LLM may run on the processor 12. LLM can determine read/write memory addresses of the ring buffer 10 and perform read/write operations based on read/write memory addresses of the ring buffer 10. In the embodiment, the ring buffer 10 can be allocated in a dynamic random-access memory (DRAM).

Here, the processor 122 or the LLM can request a first cache tensor buffer in the ring buffer and obtain a starting memory address of the first cache tensor buffer, wherein the first cache tensor buffer comprises a plurality of space segments that form a first cache tensor buffer matrix. The plurality of space segments have continuous memory addresses. Each row of the first cache tensor buffer matrix comprises C space segments. C is a cache size. A starting address of each row of the first cache tensor buffer matrix is continuous with an ending address of the previous row of the first cache tensor buffer matrix. The LLM can generate data of a first output according to Q input tokens of the LLM. The processor 122 or the LLM can shift the starting memory address of the first cache tensor buffer according to the number Q of input tokens of the LLM for updating the first cache tensor buffer. The updated first cache tensor buffer forms an updated first matrix, wherein the updated first matrix comprises at least one overhead space segment at the end of its last row, wherein the number of overhead space segments may equal to the number of input tokens of the LLM. The number of overhead space segments may be Q. The LLM can control a first output as Q column vectors to be written into last Q column vectors of the updated first cache tensor buffer matrix. In the ring buffer storage system 100, an address space of the Q overhead space segments is equal to $Q \times S$. S is the stride size equal to one space segment. In the following embodiments and drawings, a size of one space segment is equal to the stride size S. Therefore, each row including C space segments corresponds to a row size equal to $C \times S$.

The number Q of the overhead space segments is smaller than the cache size C. Q, C, and S are positive integers. Details of performing a ring buffer storage method and definitions of parameters of the ring buffer storage system 100 are illustrated below.

FIG. 2 illustrates a schematic of performing a ring buffer storage method by the ring buffer storage system 100. The ring buffer storage method includes step S101 to step S105.

Step S101: A decoder layer K in the LLM receives hidden state of input tokens from a decoder layer K−1. The decoder layer K reads contents of K cache tensor buffer based on the starting memory address of K cache tensor buffer and read contents of V cache tensor buffer based on the starting memory address of V cache tensor buffer.

The LLM comprises a plurality of decoder layer K. A decoder layer outputs hidden state of input tokens to the next decoder layer. Each layer has its own K cache tensor buffer and V cache tensor buffer. In this step, the starting memory address of K cache tensor buffer and the starting memory address of V cache tensor buffer may be calculated by a processor 122. Alternatively, the starting memory address of K cache tensor buffer and the starting memory address of V cache tensor buffer may be calculated by the LLM.

The K cache tensor buffer comprises a plurality of space segments that form a K cache tensor buffer matrix. The plurality of space segments have continuous memory addresses. Each row of the K cache tensor buffer matrix comprises C space segments. C is a cache size. A starting address of each row of the K cache tensor buffer matrix is continuous with an ending address of the previous row of the K cache tensor buffer matrix. The V cache tensor buffer matrix has a similar structure to the K cache tensor buffer matrix.

Step S102: The decoder layer K determines updated hidden state of input tokens and key data and value data of input tokens based on received hidden state of input tokens and the contents of K cache tensor buffer and contents of V cache tensor buffer.

Step S103: A starting memory address of the K cache tensor buffer is shifted according to the number Q of input tokens of the LLM for updating the K cache tensor buffer. A starting memory address of the V cache tensor buffer is shifted according to the number Q of input tokens of the LLM for updating the V cache tensor buffer.

The step S103 may be performed by a processor 122. Alternatively, the step S103 may be performed by the LLM. The updated K cache tensor buffer forms an updated K cache tensor buffer matrix, wherein the updated K cache tensor buffer matrix comprises Q overhead space segments at the end of its last row. The updated V cache tensor buffer forms an updated V cache tensor buffer matrix, wherein the updated V cache tensor buffer matrix comprises Q overhead space segments at the end of its last row.

Step S104: The decoder layer K writes key data of input tokens into last Q column vectors of the updated K cache tensor buffer matrix and writes value data of input tokens into last Q column vectors of the updated V cache tensor buffer matrix. The decoder layer K outputs the updated hidden state of input tokens to the decoder layer K+1.

Alternatively, the decoder layer K may write key data of input tokens into a buffer with continuous addresses. Data segments of key data are copied from the buffer to last Q column vectors of the updated K cache tensor buffer matrix. The decoder layer K may write value data of input tokens into a buffer with continuous addresses. Data segments of value data are copied from the buffer to the last Q column vectors of the updated V cache tensor buffer matrix.

Figure 3:
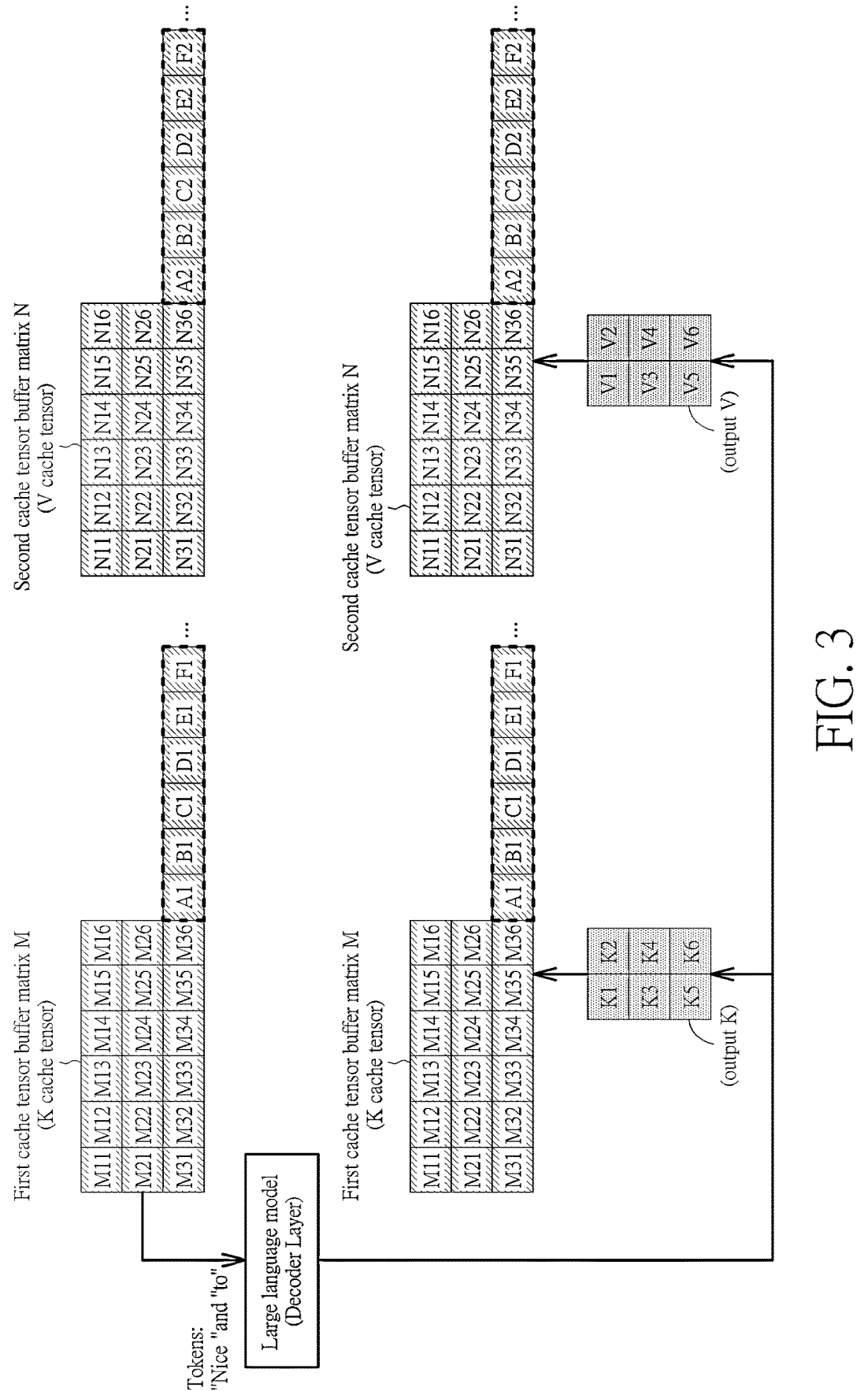
FIG. 3 illustrates a first state of K/V cache tensor buffer matrices under a first storage mode of the ring buffer storage system in FIG. 1A.

FIG. 3 illustrates a first write state of K/V cache tensor buffer matrices under a first storage mode of the ring buffer storage system 100. As previously mentioned, K cache tensor buffer forms K cache tensor buffer matrix M and V cache tensor buffer forms V cache tensor buffer matrix N. To avoid ambiguity, the K/V cache tensor buffer matrices are called as a first cache buffer matrix M (for key cache tensor) and a second cache buffer matrix N (for value cache tensor). A dimension of the first cache tensor buffer matrix M is (R1, C×S). A dimension of the second cache tensor buffer matrix is (R2, C×S). R1 is a row dimension of the first cache buffer matrix M. R2 is a row dimension of the second cache buffer matrix N. R1 and R2 are positive integers. C is a cache size. S is the stride size, regarding to a step length of one segment. In an embodiment, row dimensions R1 and R2, and stride size S are determined according to the architecture of the LLM. The cache size C is determined according to the use case scenario and is smaller than or equal to the longest token length supported by the LLM. The first cache tensor buffer matrix M includes a plurality of space segments M11 to M16, M21 to M26, and M31 to M36. The plurality of space segments M11 to M16, M21 to M26, and M31 to M36 have continuous memory addresses. For example, memory addresses of the space segments M11 to M16, M21 to M26, and M31 to M36 can be presented as Table T1:

TABLE T1

| Memory addresses | #1 to #6 | #7 to #12 | #13 to #18 |
|---|---|---|---|
| Space segments | M11 to M16 | M21 to M26 | M31 to M36 |

Similarly, the second cache tensor buffer matrix N includes a plurality of space segments N11 to N16, N21 to N26, and N31 to N36. The plurality of space segments N11 to N16, N21 to N26, and N31 to N36 have continuous memory addresses. Since the second cache tensor buffer matrix N also includes "continuous" space segments, its memory address allocations are omitted here.

The processor 122 or the LLM allocates predetermined number m' of space segments as overhead space segments to append the first cache tensor buffer matrix. Similarly, the processor 12 or the LLM allocates predetermined number n' of space segments as overhead space segments to append the second cache tensor buffer matrix. In some embodiments, the predetermined number m' can be greater than or equal to the cache size C. The predetermined number n' can be greater than or equal to the cache size C. As shown in FIG. 3, overhead space segments appended the first cache tensor buffer matrix comprise A1, B1, C1, D1, E1, and F1, and overhead space segments appended the second cache tensor buffer matrix comprise A2, B2, C2, D2, E2, and F2. Here, each overhead space segment occupies an address space equal to S. The first cache tensor buffer matrix M can be regarded as an "empty" matrix. Similarly, the second cache tensor buffer matrix N can be regarded as an "empty" matrix.

It is assumed that two input tokens are processed by the LLM, for example, the two input tokens are "Nice" and "to". After the output key data of the two input tokens is generated from the LLM, the output key data of the two input tokens is directly or indirectly written into last Q=2 column vectors of the first cache tensor buffer matrix M in the ring buffer 10. If hardware running the LLM has a capability to directly write the output key data of the two input tokens into last Q=2 column vectors of the first cache tensor buffer matrix M, the output key data of the two input tokens is directly written into last Q=2 column vectors of the first cache tensor buffer matrix M. If the hardware running the LLM has no such capability, the output key data of the two input tokens are written into a continuous buffer, and the output key data of the two input tokens are copied from the continuous buffer to last Q=2 column vectors of the first cache tensor buffer segment by segment. For example, data of a data segment K1 is written into an "empty" space segment M15. Data of a data segment K2 is written into an "empty" space segment M16. Data of a data segment K3 is written into an "empty" space segment M25. Data of a data segment K4 is written into an "empty" space segment M26. Data of a data segment K5 is written into an "empty" space segment M35. Data of a data segment K6 is written into an "empty" space segment M36. Similarly, after the output value data of the two input tokens is generated, the output value data of the two input tokens is directly or indirectly written into last Q=2 column vectors of the second cache tensor buffer matrix N. For example, data of a data segment V1 is written into an "empty" space segment N15. Data of a data segment V2 is written into an "empty" space segment N16. Data of a data segment V3 is written into an "empty" space segment N25. Data of a data segment V4 is written into an "empty" space segment N26. Data of a data segment V5 is written into an "empty" space segment N35. Data of a data segment V6 is written into an "empty" space segment N36.

Figure 4:
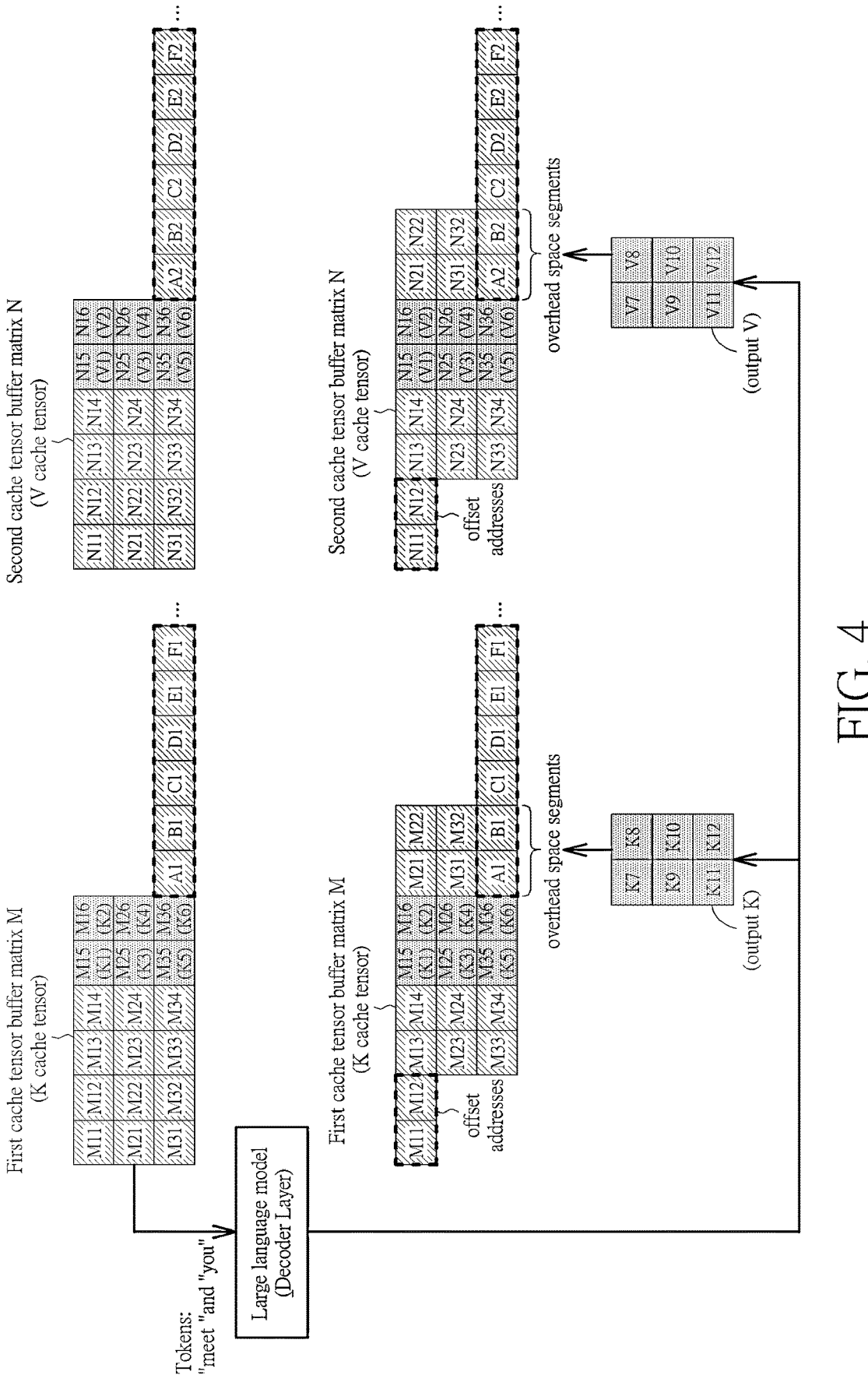
FIG. 4 illustrates a second state of the K/V cache tensor buffer matrices under the first storage mode of the ring buffer storage system in FIG. 1A.

FIG. 4 illustrates a second write state of the K/V cache tensor buffer matrices under the first storage mode of the ring buffer storage system 100. In previous state, data of the data segments K1 to K6 can be written into the last Q=2 column vectors of the first cache tensor buffer matrix M. Data of the data segments V1 to V6 can be written into the last Q=2 column vectors of the second cache tensor buffer matrix N. Then, two input tokens are further processed by the LLM, for example, the two input tokens are "meet" and "you".

Then, the starting memory address of the first cache tensor buffer is shifted based on the number of the input tokens of the LLM for updating the first cache tensor buffer. The updated first cache tensor buffer forms the updated first cache tensor buffer matrix M. The updated first cache tensor buffer matrix M comprises overhead space segments A1 and B1 at the end of its last low. Similarly, the starting memory address of the second cache tensor buffer is shifted based on the number of the input tokens of the LLM for updating the second cache tensor buffer. The updated second cache tensor buffer forms the updated second cache tensor buffer matrix N. The updated second cache tensor buffer matrix N comprises overhead space segments A2 and B2 at the end of its last row.

The (original) first cache tensor buffer matrix M can be viewed as a flat array in Table T2.

TABLE T2

| First cache tensor buffer matrix M (flat form) | | |
|---|---|---|
| M11 to M16 | M21 to M26 | M31 to M36 |

For example, when the number of input tokens is 2, the starting memory address of the first cache tensor buffer is shifted by incrementing a first offset memory address equal to 2×S. As a result, the first cache tensor buffer matrix M can be updated, as expressed in Table T4.

TABLE T4

| Offset space segments (Offset memory addresses) | First cache tensor buffer matrix M (flat form) | |
|---|---|---|
| M11 and M12 | M13 to M16, M21 to M22 | M23 to M26, M33 to M36, A1, M31 to M32  B1 |

Here, after the first cache tensor buffer matrix M is updated, its first row includes space segments M13 to M16, and M21 to M22. Its second row includes space segments M23 to M26 and M31 to M32. Its third row includes space segments M33 to M36, A1, and B1. In FIG. 4, the last Q=2 column vectors of the first cache tensor buffer matrix M include "empty" space segments {M21 and M22, M31 and M32, A1 and B1}. It should be understood that the space segments {M21 and M22, M31 and M32, A1 and B1} of the last Q=2 first column vectors of the updated first cache tensor buffer matrix M are discontinuous. Therefore, the last Q=2 column vectors of the first cache tensor buffer matrix M can be used for caching data of data segments of the output key data. Data of each data segment of the output key data is directly or indirectly written to a corresponding space segment of the last Q=2 column vectors of the updated first cache tensor buffer matrix M according to its memory address. For example, a data of a data segment K7 is written into an "empty" space segment M21. Data of a data segment K8 is written into an "empty" space segment M22. Data of a data segment K9 is written into an "empty" space segment M31. Data of a data segment K10 is written into an "empty" space segment M32. Data of a data segment K11 is written into an "empty" space segment A1. Data of a data segment K12 is written into an "empty" space segment B1.

Similarly, when the number of input tokens is 2, starting memory address of the second cache tensor buffer by incrementing an offset memory address equal to 2×S. As a result, the second cache tensor buffer matrix N can be updated. After the second cache tensor buffer matrix N is updated, its first row includes space segments N13 to N16, and N21 to N22. Its second row includes space segments N23 to N26 and N31 to N32. Its third row includes space segments N33 to N36, A2, and B2. In FIG. 4, the last Q=2 column vectors of the second cache tensor buffer matrix N include "empty" space segments {N21 and N22, N31 and N32, A2 and B2}. It should be understood that the space segments {N21 and N22, N31 and N32, A2 and B2} of the last Q=2 second column vectors of the updated second cache tensor buffer matrix N are discontinuous. Therefore, the last Q=2 column vectors of the second cache tensor buffer matrix N can be used for caching data of data segments of the output key data. Data of each segment of the output key data is directly or indirectly written to a corresponding space segment of the last Q=2 second column vectors of the updated second cache tensor buffer matrix N according to its memory address. For example, data of a data segment V7 is written into an "empty" space segment N21. Data of a data segment V8 is written into an "empty" space segment N22. Data of a data segment V9 is written into an "empty" space segment N31. Data of a data segment V10 is written into an "empty" space segment N32. Data of a data segment V11 is written into an "empty" space segment A2. Data of a data segment V12 is written into an "empty" space segment B2.

Figure 5:
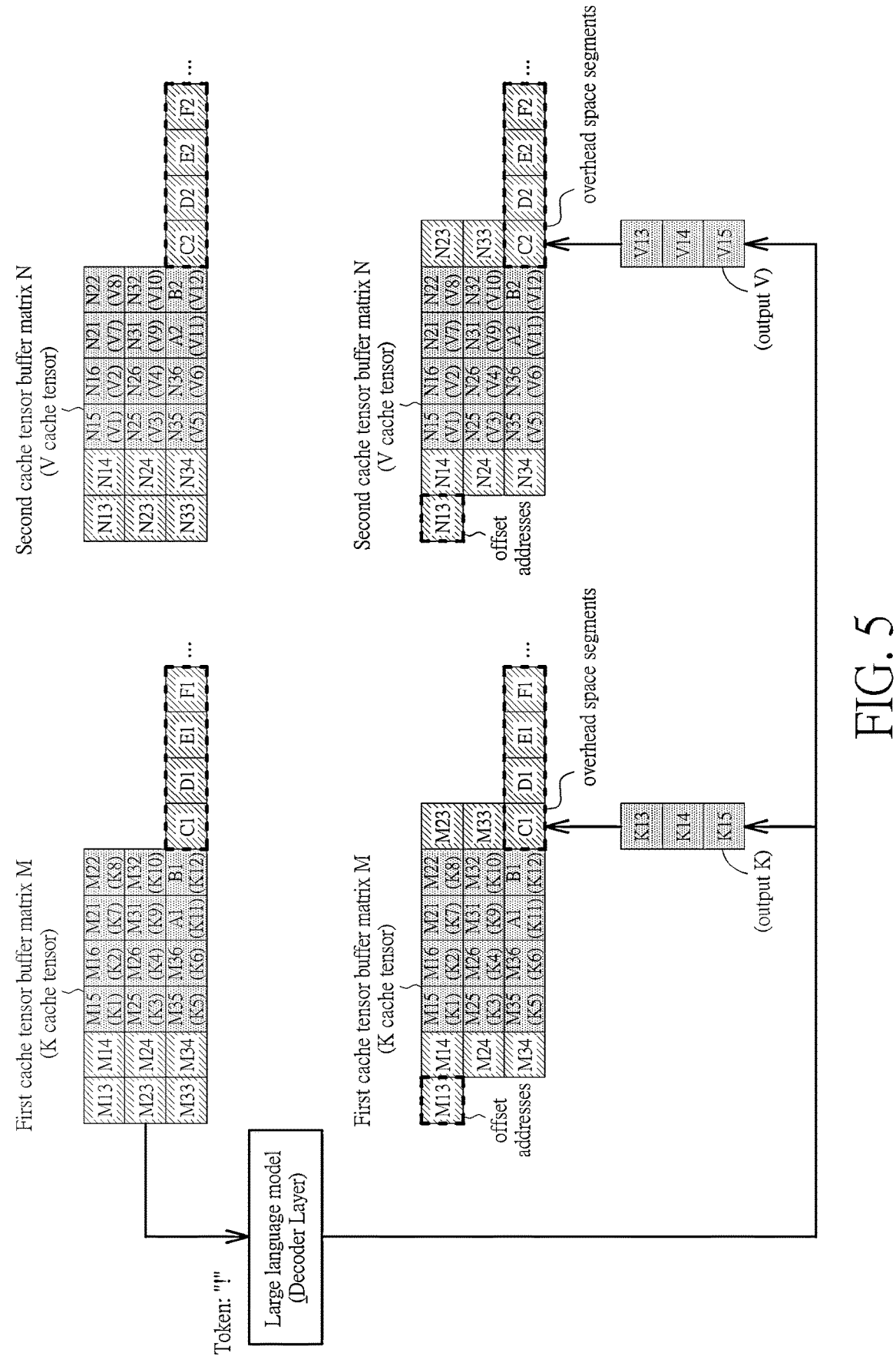
FIG. 5 illustrates a third state of the K/V cache tensor buffer matrices under the first storage mode of the ring buffer storage system in FIG. 1A.

FIG. 5 illustrates a third state of the K/V cache tensor buffer matrices under the first storage mode of the ring buffer storage system 100. Here, one input token is further processed by the LLM, for example, the one input token is "!".

Then, the starting memory address of the first cache tensor buffer can be shifted according to the number of the input token for caching the output key data generated from the LLM. The updated first cache tensor buffer forms the updated first cache tensor buffer matrix M. The updated first cache tensor buffer matrix M comprises one overhead space segment C1 at the end of its last row. The starting memory address of the second cache tensor buffer can be shifted according to the number of the input token for caching the output value data generated from the LLM. The updated second cache tensor buffer forms the updated second cache tensor buffer matrix N. The updated second cache tensor buffer matrix N comprises one overhead space segment C2 at the end of its last row.

For example, when the number of input tokens is 1, the starting memory address of the first cache tensor buffer is shifted by incrementing an offset memory address equal to 1×S. As a result, the first cache tensor buffer matrix M can be updated. By doing so, the first cache tensor buffer matrix M can be viewed as a flat array in Table T5.

TABLE T5

| Offset segment (Offset memory address) | First cache tensor buffer matrix M (flat form) | |
|---|---|---|
| M13 | M14 to M16, M21 to M23 | M24 to M26, M34 to M36, A1, M31 to M33  B1, C1 |

Here, after the first cache tensor buffer matrix M is updated, its first row includes space segments M14 to M16, and M21 to M23. Its second row includes space segments M24 to M26 and M31 to M33. Its third row includes M34 to M36, A1, B1, and C1. In FIG. 5, the last Q=1 column vector of the first cache tensor buffer matrix M includes "empty" space segments {M23, M33, and C1}. It should be understood that the space segments {M23, M33, and C1} of the last Q=1 column vector of the updated first cache tensor buffer matrix M are discontinuous. Therefore, the last Q=1 column vector of the first cache tensor buffer matrix M can be used for caching data of data segments of the output key data. Data of each segment of the output key data is directly or indirectly written to a corresponding space segment of the last Q=1 column vector of the updated first cache tensor buffer matrix M according to its memory address. For example, data of a data segment K13 is written into an "empty" space segment M23. Data of a data segment K14 is written into an "empty" space segment M33. Data of a data segment K15 is written into an "empty" space segment C1.

Similarly, when the number of input tokens is 1, the starting memory address of the second cache tensor buffer is shifted by incrementing an offset memory address equal to 1×S. As a result, the second cache tensor buffer matrix N can be updated. After the second cache tensor buffer matrix N is updated, its first row includes space segments N14 to N16, and N21 to N23. Its second row includes space segments N24 to N26 and N31 to N33. Its third row includes N34 to N36, A2, B2, and C2. In FIG. 5, the last Q=1 column vector of the second cache tensor buffer matrix N includes "empty" space segments {N23, N33, and C2}. It should be understood that the space segments {N23, N33, and C2} of the last Q=1 second column vector of the updated second cache tensor buffer matrix N are discontinuous. Therefore, the last Q=1 column vector of the second cache tensor buffer matrix N can be used for caching data of data segments of the output value data. Data of each segment of the output value data is directly or indirectly written to a corresponding segment of the last Q=1 column vector of the updated second cache tensor buffer matrix N according to its memory address. For example, data of a data segment V13 is written into an "empty" space segment N23. Data of a data segment V14 is written into an "empty" space segment N33. Data of a data segment V15 is written into an "empty" space segment C2.

Therefore, instead of using twice model input cache size for avoiding resetting the ring buffer 10 (or say, a memory copy process), the ring buffer only incurs slightly extra memory without needing to reset to the top via memory copy.

Figure 6:
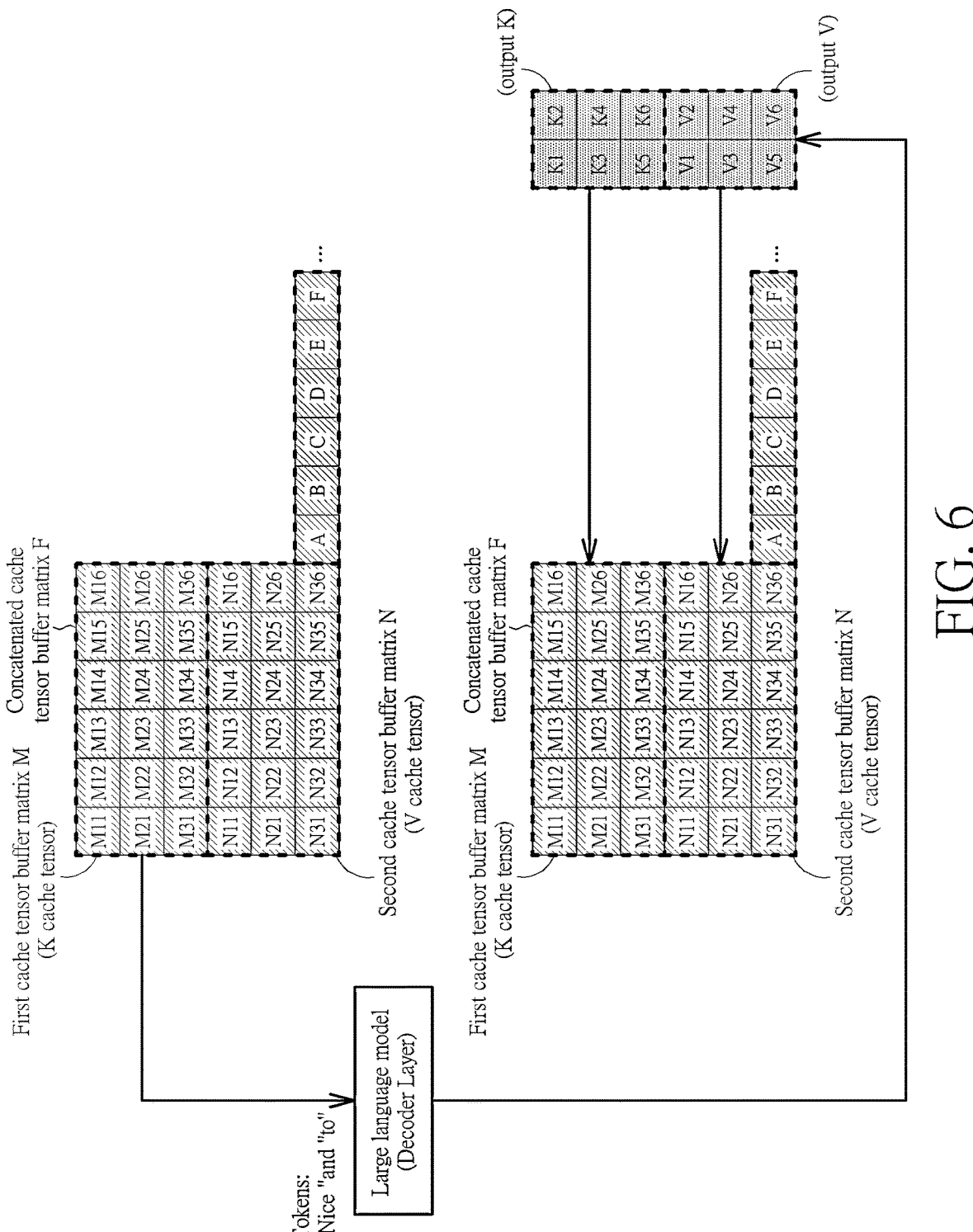
FIG. 6 illustrates a first state of a concatenated cache tensor buffer matrix under a second storage mode of the ring buffer storage system in FIG. 1A.

FIG. 6 illustrates a first write state of a concatenated cache tensor buffer matrix under a second storage mode of the ring buffer storage system 100. In the embodiment, different cache tensor buffers are concatenated for generating a concatenated cache tensor buffer. Each cache tensor buffer forms one cache tensor buffer matrix, and the concatenated cache tensor buffer forms the concatenated cache tensor buffer matrix. In the embodiment, the memory caching efficiency can be further enhanced by combining different cache tensor buffer matrices, as illustrated below. As previously mentioned, the dimension of the first cache tensor buffer matrix M is (R1, C×S). The dimension of the second cache tensor buffer matrix is (R2, C×S). The row dimension R1 and the row dimension R2 can be different. Then, the first cache tensor buffer matrix M and the second cache tensor buffer matrix N can be concatenated for generating a concatenated cache tensor buffer matrix F. The concatenated cache tensor buffer matrix F includes a plurality of space segments M11 to M16, M21 to M26, M31 to M36, N11 to N16, N21 to N26, and N31 to N36. The plurality of space segments M11 to M16, M21 to M26, M31 to M36, N11 to N16, N21 to N26, and N31 to N36 have continuous memory addresses. For example, memory addresses of the space segments M11 to M16, M21 to M26, and M31 to M36 can be presented as Table T6:

TABLE T6

| Memory addresses | #1 to #6 | #7 to #12 | #13 to #18 |
|---|---|---|---|
| Space segments | M11 to M16 | M21 to M26 | M31 to M36 |
| Memory addresses | #19 to #24 | #25 to #30 | #31 to #36 |
| Space segments | N11 to N16 | N21 to N26 | N31 to N36 |

The processor 122 or the LLM allocates predetermined number L' of space segments as overhead space segments to append the concatenated cache tensor buffer matrix. In some embodiments, the predetermined number L' can be greater than or equal to the cache size C. As shown in FIG. 6, overhead space segments appended the concatenated cache tensor buffer matrix comprise A, B, C, D, E and F. Here, each overhead space segment occupies an address space equal to S. The concatenated cache tensor buffer matrix F can be regarded as an "empty" matrix.

It is assumed two input tokens are processed by the LLM, for example, the two input tokens are "Nice" and "to". After the output key data of the two tokens is generated from the LLM, the output key data of the two tokens can be directly or indirectly written into corresponding space segments of the concatenated cache tensor buffer matrix F. The methods of direct writing and indirect writing are similar to those in the previous embodiments and will not be described in detail here for the sake of brevity. For example, data of the data segment K1 is written into the "empty" space segment M15. Data of the data segment K2 is written into the "empty" space segment M16. Data of the data segment K3 is written into the "empty" space segment M25. Data of the data segment K4 is written into the "empty" space segment M26. Data of the data segment K5 is written into the "empty" space segment M35. Data of the data segment K6 is written into the "empty" space segment M36. Similarly, after the output value data of the two tokens is directly or indirectly generated from the LLM, the output value data of the two tokens can be written into corresponding space segments of the concatenated cache tensor buffer matrix F. For example, data of the data segment V1 is written into the "empty" space segment N15. Data of the data segment V2 is written into the "empty" space segment N16. Data of the data segment V3 is written into the "empty" space segment N25. Data of the data segment V4 is written into the "empty" space segment N26. Data of the data segment V5 is written into the "empty" space segment N35. Data of the data segment V6 is written into the "empty" space segment N36.

Figure 7:
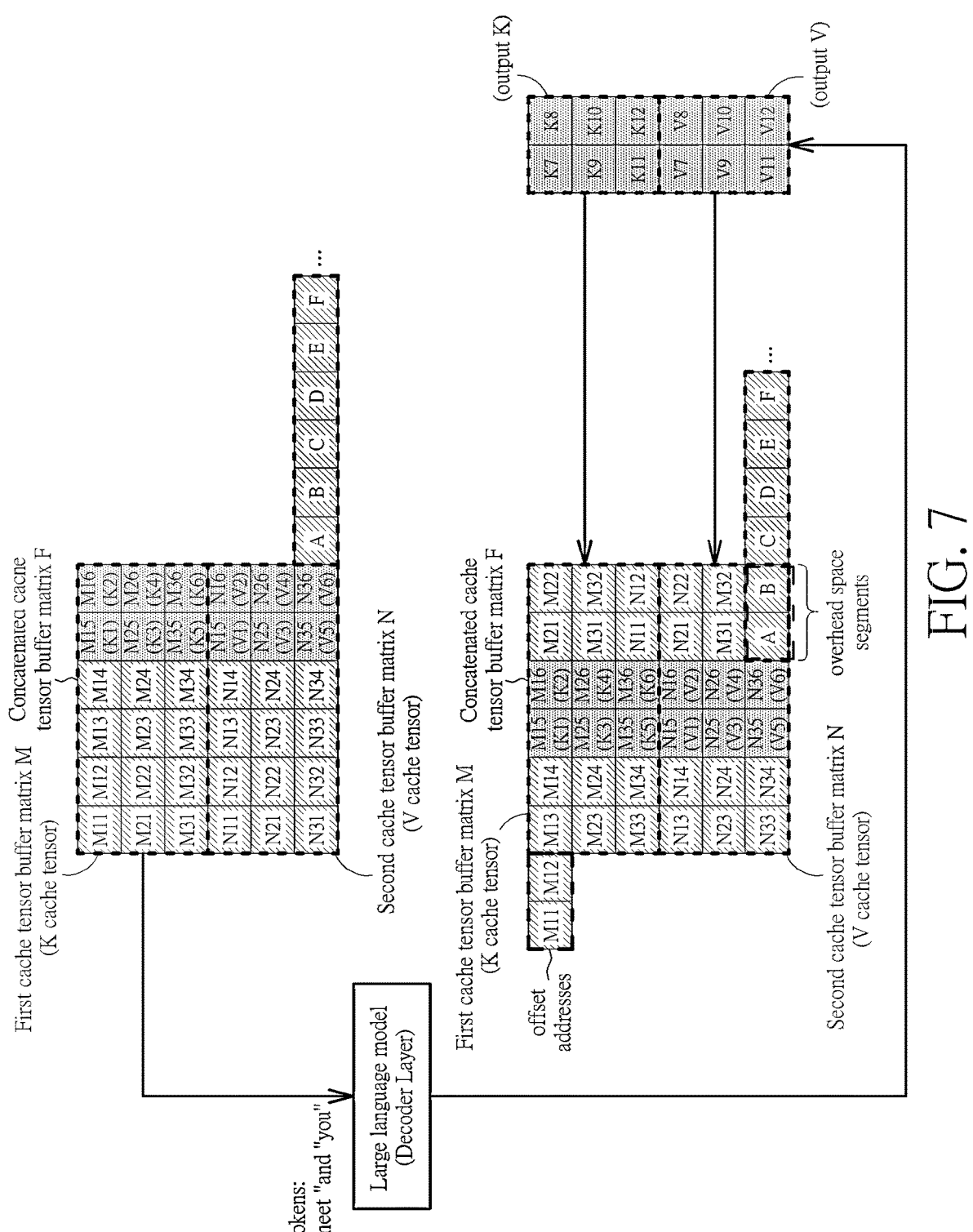
FIG. 7 illustrates a second state of the concatenated cache tensor buffer matrix under the second storage mode of the ring buffer storage system in FIG. 1A.

FIG. 7 illustrates a second write state of the concatenated cache tensor buffer matrix F under the second storage mode of the ring buffer storage system 100. In previous state, data of the data segments K1 to K6 of the output key data and the data segments V1 to V6 of the output value data are written into the last Q=2 column vectors of the concatenated cache tensor buffer matrix F. Then, two input tokens are further processed by the LLM, for example, two input tokens are "meet" and "you". The number Q of input tokens is 2.

The (original) concatenated cache tensor buffer matrix F can be viewed as a flat array in Table T7.

TABLE T7

| Concatenated cache tensor buffer matrix F (flat form) | | | | | |
|---|---|---|---|---|---|
| M11 to M16 | M21 to M26 | M31 to M36 | N11 to N16 | N21 to N26 | N31 to N36 |

Then, the starting memory address of the first cache tensor buffer is shifted by incrementing an offset memory address equal to 2×S. As a result, the first cache tensor buffer matrix M can be updated. The starting memory address of the second cache tensor buffer is shifted by incrementing an offset memory address equal to 2×S. As a result, the second cache tensor buffer matrix N can be updated. A size of an address space of the first cache tensor buffer matrix is R1×C×S. Similarly, a size of an address space of the second cache tensor buffer matrix is R2×C×S. As a result, the concatenated cache tensor buffer matrix F can be updated, as expressed in Table T8.

TABLE T8

| Offset space segments | Concatenated cache tensor buffer matrix F (flat form) | | | | | |
|---|---|---|---|---|---|---|
| M11 and M12 | M13 to M16, M21 to M22 | M23 to M26, M31 to M32 | M33 to M36, N11 to N12 | N13 to N16, N21 to N22 | N23 to N26, N31 to N32 | N33 to N36, A, B |

Here, after the concatenated cache tensor buffer matrix F is updated, its first row includes space segments M13 to M16, and M21 to M22. Its second row includes space segments M23 to M26 and M31 to M32. Its third row includes space segments M33 to M36 and N11 to N12. Its fourth row includes space segments N13 to N16 and N21 to N22. Its fifth row includes space segments N23 to N26 and N31 to N32. Its sixth row includes space segments N33 to N36, A, and B. In FIG. 7, the last Q=2 column vectors of the concatenated cache tensor buffer matrix F include "empty" space segments {M21 to M22, M31 to M32, N11 to N12, N21 to N22, N31 to N32, A, and B}. It should be understood that the space segments {M21 to M22, M31 to M32, N11 to N12, N21 to N22, N31 to N32, A, and B} of the last Q=2 column vectors of the concatenated cache tensor buffer matrix F can be used for caching data of data segments of the output key data and the output value data. Data of each segment of the output key data and the output value data is directly or indirectly written to a corresponding segment of the concatenated cache tensor buffer matrix F according to its memory address. For example, data of the data segment K7 is written into the "empty" space segment M21. Data of the data segment K8 is written into the "empty" space segment M22. Data of the data segment K9 is written into the "empty" space segment M31. Data of the data segment K10 is written into the "empty" space segment M32. Data of the data segment K11 is written into the "empty" space segment N11. Data of the data segment K12 is written into the "empty" space segment N12. Data of the data segment V7 is written into the "empty" space segment M21. Data of the data segment V8 is written into the "empty" space segment N22. Data of the data segment V9 is written into the "empty" space segment N31. Data of the data segment V10 is written into the "empty" space segment N32. Data of the data segment V11 is written into the "empty" space segment A. Data of the data segment V12 is written into the "empty" space segment B.

Figure 8:
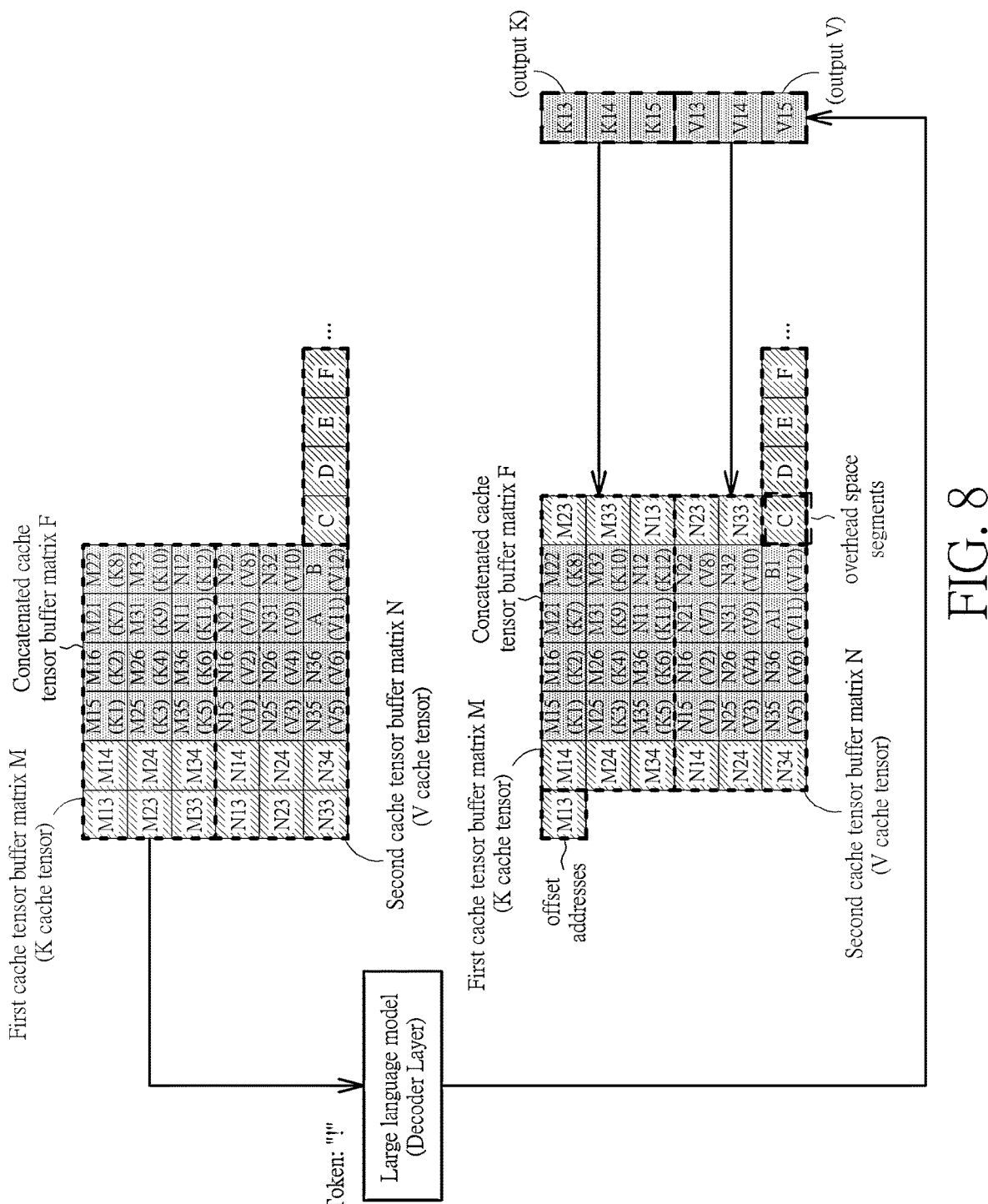
FIG. 8 illustrates a third state of the concatenated cache tensor buffer matrix under the second storage mode of the ring buffer storage system in FIG. 1A.

FIG. 8 illustrates a third write state of the concatenated cache tensor buffer matrix F under the second storage mode of the ring buffer storage system 100. Here, one input token is further processed by the LLM, for example, the input token is "!". The number Q of input tokens is 1.

Then, the starting memory address of the first cache tensor buffer is shifted by incrementing an offset memory address equal to 1×S. As a result, the first cache tensor buffer matrix M can be updated. The starting memory address of the second cache tensor buffer is shifted by incrementing an offset memory address equal to 1×S. As a result, the second cache tensor buffer matrix N can be updated. By doing so, the concatenated cache tensor buffer matrix F can be viewed as a flat array in Table T9.

TABLE T9

| Offset space segments | Concatenated cache tensor buffer matrix F (flat form) | | | | | |
|---|---|---|---|---|---|---|
| M13 | M14 to M16, M21 to M23 | M24 to M26, M31 to M33 | M33 to M36, N11 to N13 | N14 to N16, N21 to N23 | N24 to N26, N31 to N33 | N34 to N36, A, B, and C |

Here, after the concatenated cache tensor buffer matrix F is updated, its first row includes space segments M14 to M16, and M21 to M23. Its second row includes space segments M24 to M26, and M31 to M33. Its third row includes space segments M33 to M36 and N11 to N13. Its fourth row includes space segments N14 to N16 and N21 to N23. Its fifth row includes space segments N24 to N26 and N31 to N33. Its sixth row includes space segments N34 to N36, A, B, and C. In FIG. 8, the last Q=1 column vector of the concatenated cache tensor buffer matrix F includes "empty" space segments {M23, M33, N13, N23, N33, and C. It should be understood that the space segments {M23, M33, N13, N23, N33, and C} of the last Q=1 column vector of the updated concatenated cache tensor buffer matrix F are discontinuous. Therefore, the last Q=1 column vector of the concatenated cache tensor buffer matrix F can be used for caching data of data segments of the output key data and the output value data. Data of each segment of the output key data is directly or indirectly written to a corresponding space segment of the concatenated cache tensor buffer matrix F according to its memory address. For example, data of the data segment K13 is written into the "empty" space segment M23. Data of the data segment K14 is written into an "empty" space segment M33. Data of the data segment K15 is written into an "empty" space segment N13. Data of the data segment V13 is written into an "empty" space segment N23. Data of the data segment V14 is written into an "empty" space segment N33. Data of the data segment V15 is written into an "empty" space segment C.

In the above FIG. 6-8, each cache tensor buffer forms one cache tensor buffer matrix, and each cache tensor buffer matrix includes multiple rows. The method in the above FIG. 6-8 may also be applied to the example where the cache tensor buffer matrix only includes one row.

In the ring buffer storage system 100, any hardware or technology modification falls into the scope of the present invention. For example, if a single, large continuous memory space is impractical or undesirable, B continuous memory blocks can be introduced for partitioning the large continuous memory space. Additionally, given B memory blocks, and assuming the sliding window capable of shifting up to Q tokens without triggering a ring buffer reset (which incurs a memory copy overhead), the total memory overhead is precisely equal to B×Q×S. B is a positive integer greater than or equal to two. For example, in aforementioned embodiments in FIG. 3-FIG. 5, the first cache tensor buffer and the second cache tensor buffer are separate memory blocks. The first cache tensor buffer and the second cache tensor buffer are appended with respective overhead segments.

In a third storage mode, different cache tensor buffers are concatenated for generating a concatenated cache tensor buffer. The different cache tensor buffers have continuous addresses. The processor 122 or the LLM allocates predetermined number L' of space segments as overhead space segments to append the concatenated cache tensor buffer. In some embodiments, the predetermined number L' can be greater than or equal to the cache size C. The concatenated cache tensor buffer forms a cache tensor buffer matrix. In the embodiment, each cache tensor buffer may be one row of the cache tensor buffer matrix.

The third storage mode can be applied to the following scenarios. The LLM comprises a plurality of decoder layers. Each decoder layer has one corresponding K cache tensor buffer and V cache tensor buffer. Each decoder layer outputs respective Key data of the input tokens to the corresponding K cache tensor buffer. The plurality of K cache tensor buffers are concatenated for generating a concatenated K cache tensor buffer. The concatenated K cache tensor buffer forms a cache tensor buffer matrix. Each decoder layer outputs respective value data of the input tokens to the corresponding V cache tensor buffer. The plurality of V cache tensor buffers are concatenated for generating a concatenated V cache tensor buffer. The concatenated V cache tensor buffer forms a cache tensor buffer matrix. The following FIG. 9-FIG. 11 will be described using the example of storing a plurality of output Key data into a plurality of K cache tensor buffers.

Figure 9:
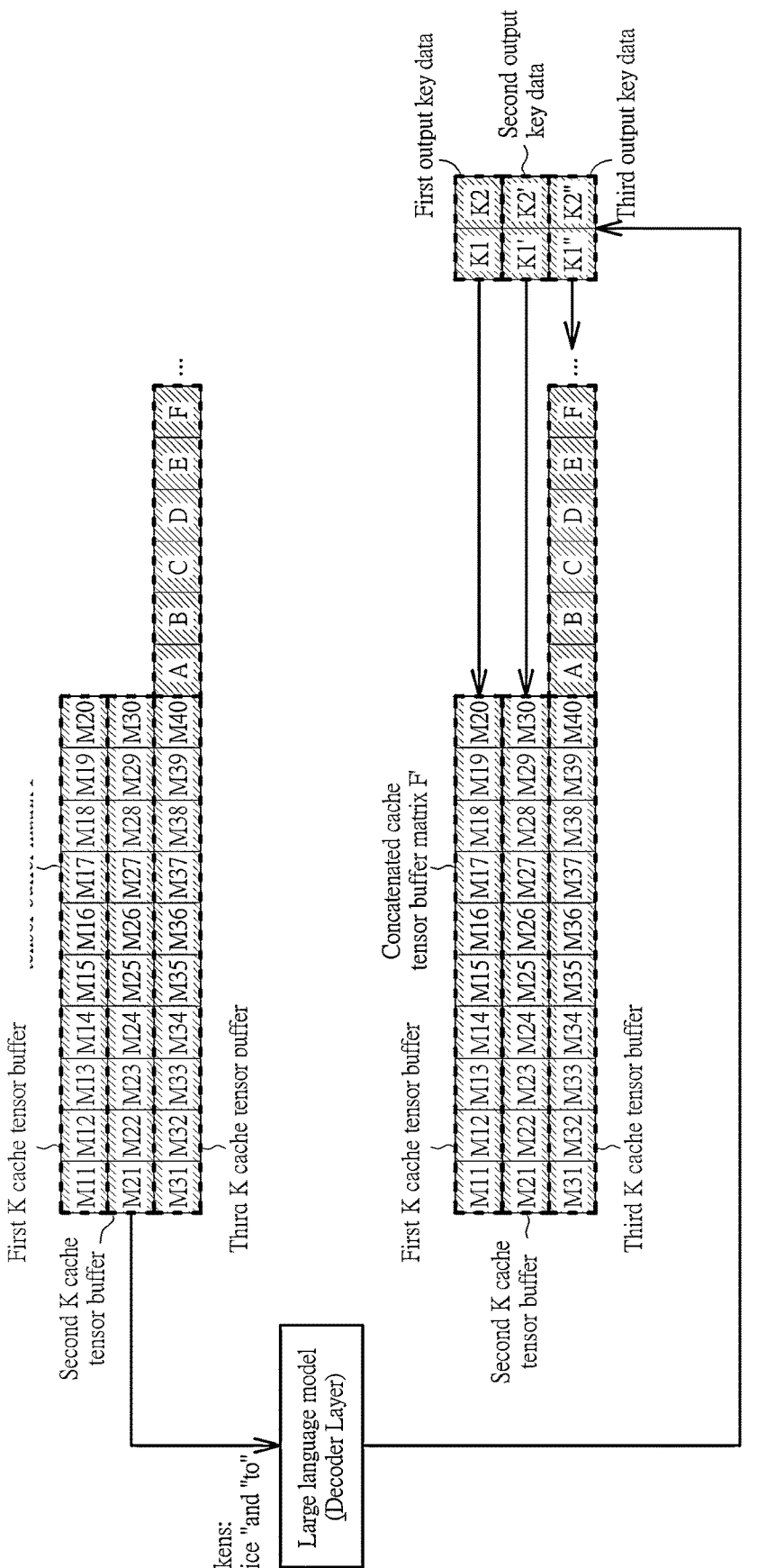
FIG. 9 illustrates a first state of a concatenated cache tensor buffer matrix under a third storage mode.

FIG. 9 illustrates a first write state of a cache tensor buffer matrix under a third storage mode of the ring buffer storage system 100. In the embodiment, 3 K cache tensor buffers are showed. Each K cache tensor buffer may be one row of the cache tensor buffer matrix.

It is assumed that two input tokens are processed by the LLM, for example, the two input tokens are "Nice" and "to".

After a first output key data of the two input tokens is generated from the LLM, the first output key data of the two input tokens is directly or indirectly written into the first K cache tensor buffer. For example, data of a data segment K1 is written into an "empty" space segment M19. Data of a data segment K2 is written into an "empty" space segment M20. After a second output key data of the two input tokens is generated from the LLM, the second output key data of the two input tokens is directly or indirectly written into the second K cache tensor buffer. For example, data of a data segment K1' is written into an "empty" space segment M29. Data of a data segment K2 is written into an "empty" space segment M30. After a third output key data of the two input tokens is generated from the LLM, the third output key data of the two input tokens is directly or indirectly written into the third K cache tensor buffer. For example, data of a data segment K1" is written into an "empty" space segment M39. Data of a data segment K2" is written into an "empty" space segment M40. In the embodiment, data of the first output key data are written into continuous space segments. Data of the second output key data are written into continuous space segments. Data of the third output key data are written into continuous space segments.

Figure 10:
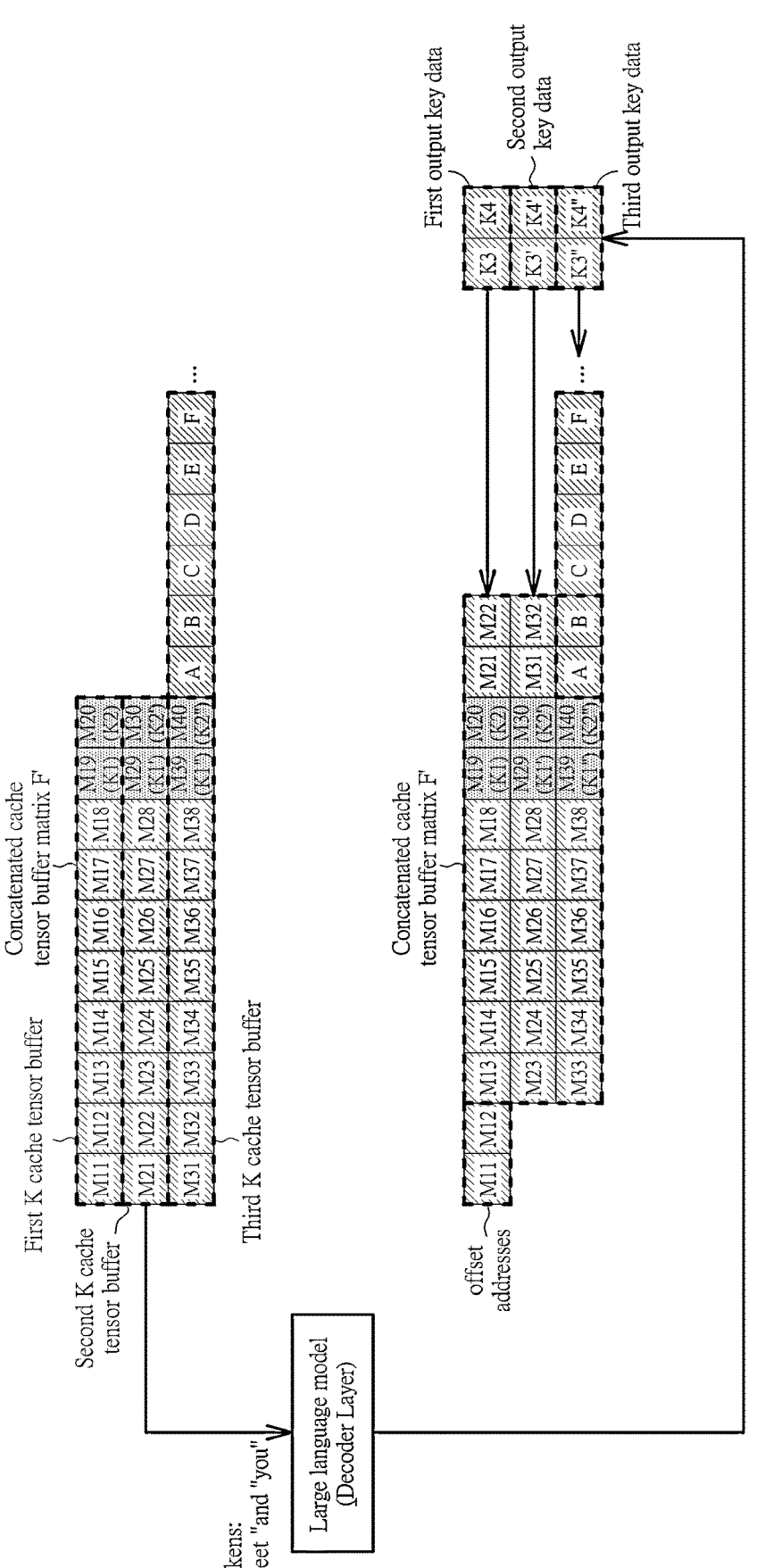
FIG. 10 illustrates a second state of the concatenated cache tensor buffer matrix under the third storage mode.

FIG. 10 illustrates a second write state of a cache tensor buffer matrix under a third storage mode of the ring buffer storage system 100. Here, two input tokens are further processed by the LLM, for example, the two input tokens are "meet" and "you".

Then, the starting memory address of the first K cache tensor buffer is shifted based on the number of the input tokens of the LLM for updating the first K cache tensor buffer. The starting memory address of the second K cache tensor buffer is shifted based on the number of the input tokens of the LLM for updating the second K cache tensor buffer. The starting memory address of the third K cache tensor buffer is shifted based on the number of the input tokens of the LLM for updating the third K cache tensor buffer. For example, when the number of input tokens is 2, the starting memory address of each K cache tensor buffer is shifted by incrementing a first offset memory address equal to 2×S. As a result, the cache tensor buffer matrix F' can be updated, as expressed in Table T10.

TABLE T10

| Offset space segments | cache tensor buffer matrix F'(flat form) | | |
|---|---|---|---|
| M11 and M12 | M13 to M22 | M23 to M32 | M33 to M40, A, B |

Data of each segment of the first, second and third output key data is directly written to a corresponding segment of the cache tensor buffer matrix F' according to its memory address. For example, data of the data segment K3 is written into the "empty" space segment M21. Data of the data segment K4 is written into the "empty" space segment M22. Data of the data segment K3' is written into the "empty" space segment M31. Data of the data segment K4' is written into the "empty" space segment M32. Data of the data segment K3" is written into the "empty" space segment A. Data of the data segment K4" is written into the "empty" space segment B.

Figure 11:
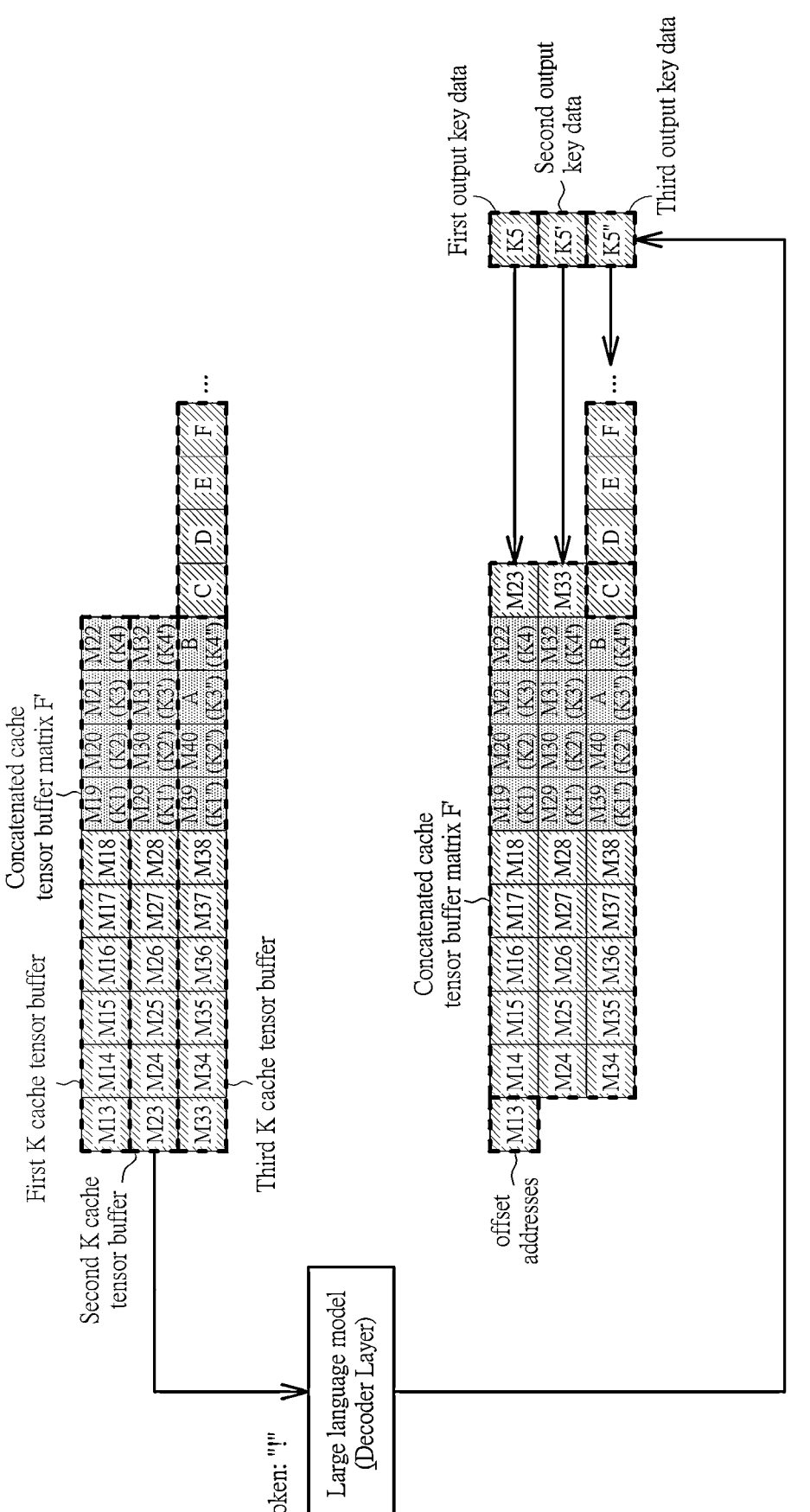
FIG. 11 illustrates a third state of the concatenated cache tensor buffer matrix under the third storage mode.

FIG. 11 illustrates a third write state of a cache tensor buffer matrix under a third storage mode of the ring buffer storage system 100. Here, one input token is further processed by the LLM, for example, the input token is "!".

Then, the starting memory addresses of the first, second and third K cache tensor buffers are shifted based on the number of the input tokens of the LLM for updating the first, second and third K cache tensor buffers. For example, when the number of input tokens is 1, the starting memory address of each K cache tensor buffer is shifted by incrementing a first offset memory address equal to 1×S. As a result, the cache tensor buffer matrix F' can be updated, as expressed in Table T11.

TABLE T11

| Offset space segments | cache tensor buffer matrix F'(flat form) |
|---|---|
| M13 | M14 to M23   M24 to M33   M34 to M40, A, B, and C |

Data of each segment of the first, second and third output key data is directly written to a corresponding segment of the cache tensor buffer matrix F' according to its memory address. For example, data of the data segment K5 is written into the "empty" space segment M23. Data of the data segment K5' is written into the "empty" space segment M33. Data of the data segment K5" is written into the "empty" space segment C.

Figure 12:
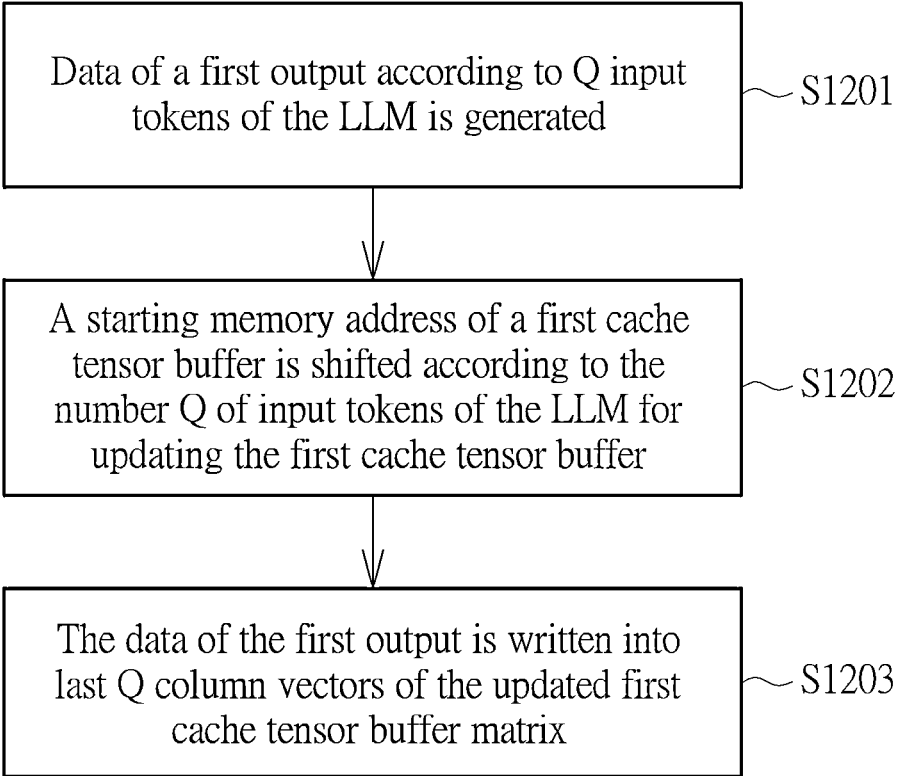
FIG. 12 illustrates a flow chart of performing a ring buffer storage method by the ring buffer storage system in FIG. 1A or FIG. 1B.

FIG. 12 illustrates a flow chart of performing a ring buffer storage method by the ring buffer storage system 100. The ring buffer storage method includes step S1201 to step S1203. Any hardware or technology modification falls into the scope of the present invention. Step S1201 to step S1203 are illustrated below.

Step S1201: Data of a first output according to Q input tokens of the LLM is generated.

Step S1202: A starting memory address of a first cache tensor buffer is shifted according to the number Q of input tokens of the LLM for updating the first cache tensor buffer. The first cache tensor buffer forms a first cache tensor buffer matrix. The updated first cache tensor buffer forms an updated first cache tensor buffer matrix. The first cache tensor buffer matrix comprises a plurality of first space segments, wherein each row of the first cache tensor buffer matrix comprises C space segments, and C is a cache size. The plurality of first space segments have continuous memory addresses. A starting address of each row of the first cache tensor buffer matrix is continuous with an ending address of the previous row of the first cache tensor buffer matrix. The updated first cache tensor buffer matrix comprises at least one overhead space segment at its last row. The number of overhead space segments may be Q.

Step S1203: The data of the first output is written into last Q column vectors of the updated first cache tensor buffer matrix.

Details of step S1201 to step S1203 are previously illustrated. Thus, they are omitted here. In the ring buffer storage system 100, since the cache tensor buffer is in the form of a matrix, appending Q overhead space segments to the matrix can provide Q*R space segments for writing, wherein R is row dimension of the matrix. With this arrangement, the total amount of overhead space segments is reduced. Instead of using twice model input cache size for avoiding resetting the ring buffer, the ring buffer only incurs slightly extra memory without needing to reset to the top via memory copy. Therefore, the memory overhead is sufficiently small to allow for an extension of the ring buffer capacity, enabling it to process the theoretical limit of the model. A ring buffer with adequate capacity eliminates the need for memory copying to reset the cache to the top. Further, no latency spike surprises due to memory copy from ring buffer reset.

FIG. 13 illustrates a flow chart of performing a ring buffer storage method by the ring buffer storage system 100. The ring buffer storage method includes step S1301 to step S1303. Any hardware or technology modification falls into the scope of the present invention. Step S1301 to step S1303 are illustrated below.

Step S1301: Data of a plurality of outputs are generated according to Q input tokens of the LLM.

Each output corresponds to one cache tensor buffer, and the plurality of outputs correspond to a plurality of cache tensor buffers. The plurality of cache tensor buffers have continuous addresses and form a concatenated cache tensor buffer. The concatenated cache tensor buffer forms a cache tensor buffer matrix. The cache tensor buffer matrix comprises a plurality of space segments, each row of the cache tensor buffer matrix comprises C space segments, and C is a cache size, a starting address of each row of the cache tensor buffer matrix is continuous with an ending address of the previous row of the cache tensor buffer matrix.

Step S1302: A starting memory address of each cache tensor buffer is shifted according to the number Q of input tokens of the LLM for updating the concatenated cache tensor buffer, wherein the updated concatenated cache tensor buffer forms an updated cache tensor buffer matrix, and the updated cache tensor buffer matrix comprises at least one overhead space segment at its last row. The number of overhead space segments may be Q.

Step S1303: The data of the plurality of outputs are written into last Q column vectors of the updated cache tensor buffer matrix. It should be understood that any reasonable hardware of technology modification falls into the scope of the present invention. For example, data of the cache tensor buffer or the cache tensor buffer matrix can be a tensor format. Further, the tensor format can include an array format, a tuple format, or other signaling format.

To sum up, the present invention discloses a ring buffer storage method and a ring buffer storage system for efficiently managing cache memory in the large language models (LLMs), particularly those based on auto-regressive architectures. The ring buffer storage system can minimize memory overhead by strategically utilizing the ring buffer as a matrix form and optimizing segment allocations. By avoiding unnecessary memory copy operations, the ring buffer storage system may maintain consistent latency when LLM updates the ring buffer each time, ensuring predictable performance. Further, the ring buffer storage system can optimize the utilization of cache memory, leading to improved overall performance and efficiency. Since the row dimension, the cache size, and the stride size can be adjustable, the ring buffer storage system can be adapted to different LLM architectures and cache requirements through adjustable parameters, and can be scaled to accommodate larger models and increasing data volumes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A ring buffer storage method comprising:

generating data of a first output according to Q input tokens of a large language model (LLM), wherein Q represents a positive integer number corresponding to a quantity of the Q input tokens; and writing the data of the first output into last Q column vectors of an updated first cache tensor buffer matrix, wherein a starting memory address of a first cache tensor buffer is shifted according to the number Q of input tokens of the LLM for updating the first cache tensor buffer, and wherein the first cache tensor buffer forms a first cache tensor buffer matrix, the updated first cache tensor buffer forms the updated first cache tensor buffer matrix, the first cache tensor buffer matrix comprises a plurality of space segments, each row of the first cache tensor buffer matrix comprises C space segments, and C is a cache size, wherein the plurality of space segments have continuous memory addresses, a starting address of each row of the first cache tensor buffer matrix is continuous with an ending address of the previous row of the first cache tensor buffer matrix, and the updated first cache tensor buffer matrix comprises at least one overhead space segment at its last row.

2. The method of claim 1, wherein the number of overhead space segments is the number Q of input tokens of the LLM, an address space of the Q overhead space segments is equal to Q×S, the number Q of overhead space segments is smaller than the cache size, S is a positive integer, a dimension of the first cache tensor buffer matrix is (R1, C×S), R1 is the row dimension, S is a stride size equal to one space segment, and R1 is a positive integer.

3. The method of claim 2, wherein before shifting the starting address of the first cache tensor buffer for the first time, an address space of overhead space segments appended to the first cache tensor buffer is at least C×S.

4. The method of claim 2, wherein the starting memory address of the first cache tensor buffer is shifted by incrementing a first offset memory address equal to Q×S.

5. The method of claim 1, wherein the space segments of the last Q column vectors of the updated first cache tensor buffer matrix are discontinuous, and data of each segment of the first output is directly or indirectly written to a corresponding segment of the last Q column vectors of the updated first cache tensor buffer matrix according to its memory address.

6. The method of claim 1, further comprising:

generating data of a second output according to Q input tokens of the LLM; and writing data of the second output into last Q column vectors of an updated second cache tensor buffer matrix;

wherein a starting memory address of a second cache tensor buffer is shifted according to the number Q of input tokens of the LLM for updating the second cache tensor buffer;

wherein the second cache tensor buffer forms a second cache tensor buffer matrix, the updated second cache tensor buffer forms the updated second cache tensor buffer matrix, wherein the second cache tensor buffer matrix comprises a plurality of space segments, the plurality of space segments have continuous memory addresses, a starting address of each row of the second cache tensor buffer matrix is continuous with an ending address of the previous row of the second cache tensor buffer matrix, and an starting memory address of the first cache tensor buffer matrix follows an end memory address of the second cache tensor buffer matrix.

7. The method of claim 6, wherein a dimension of the second cache tensor buffer matrix is (R2, C×S), R2 is the row dimension of the second cache tensor buffer matrix, a dimension of the second cache tensor buffer matrix is (R2, C×S), a starting memory address of the second cache tensor buffer is shifted by incrementing a second offset memory address equal to Q×S, S is a stride size equal to one space segment, S is a positive integer, and R2 is a positive integer.

8. The method of claim 7, wherein the space segments of the last Q column vectors of the updated second cache tensor buffer matrix are discontinuous, and data of each segment of the second output is directly or indirectly written to a corresponding segment of the last Q column vectors of the updated second cache tensor buffer matrix according to its memory address.

9. The method of claim 1, further comprising:

reading a content of the first cache tensor buffer before the starting memory address of the first cache tensor buffer is shifted, and wherein the data of the first output is generated based on the content of the first cache tensor buffer and the Q input tokens of the LLM.

10. A ring buffer storage method comprising:

generating data of a plurality of outputs according to Q input tokens of a large language model (LLM), wherein Q represents a positive integer number corresponding to a quantity of the Q input tokens, wherein each output corresponds to one cache tensor buffer, and the plurality of outputs correspond to a plurality of cache tensor buffers, and the plurality of cache tensor buffers have continuous addresses and forms a concatenated cache tensor buffer, the concatenated cache tensor buffer forms a cache tensor buffer matrix; the cache tensor buffer matrix comprises a plurality of space segments, each row of the cache tensor buffer matrix comprises C space segments, and C is a cache size, a starting address of each row of the cache tensor buffer matrix is continuous with an ending address of the previous row of the cache tensor buffer matrix, and writing the data of the plurality of outputs into last Q column vectors of an updated cache tensor buffer matrix, wherein a starting memory address of each cache tensor buffer is shifted according to the number Q of input tokens of the LLM for updating the concatenated cache tensor buffer, wherein the updated concatenated cache tensor buffer forms an updated cache tensor buffer matrix, and the updated cache tensor buffer matrix comprises at least one overhead space segment at its last row.

11. The method of claim 10, wherein the number of overhead space segments is the number Q of input tokens of the LLM, an address space of the Q overhead space segments is equal to Q×S, S is a stride size equal to one space segment, the number Q of overhead space segments is smaller than the cache size, S is a positive integer.

12. A ring buffer storage system comprising:

a ring buffer; and a processor coupled to the ring buffer and the LLM;

wherein the processor generates data of a first output according to Q input tokens of a large language model (LLM), wherein Q represents a positive integer number corresponding to a quantity of the Q input tokens, and writes the data of the first output into last Q column vectors of an updated first cache tensor buffer matrix, wherein a starting memory address of a first cache tensor buffer is shifted according to the number Q of input tokens of the LLM for updating the first cache tensor buffer, wherein the first cache tensor buffer forms a first cache tensor buffer matrix, the updated first cache tensor buffer forms the updated first cache tensor buffer matrix, the first cache tensor buffer matrix comprises a plurality of space segments, each row of the first cache tensor buffer matrix comprises C space segments, and C is a cache size, wherein the plurality of space segments have continuous memory addresses, a starting address of each row of the first cache tensor buffer matrix is continuous with an ending address of the previous row of the first cache tensor buffer matrix, and the updated first cache tensor buffer matrix comprises at least one overhead space segment at its last row.

13. The method of claim 10, wherein the starting memory address of each cache tensor buffer is shifted by incrementing a first offset memory address equal to Q×S, S is a positive integer, and S is a stride size equal to one space segment.

14. The method of claim 10, wherein the space segments of the last Q column vectors of the updated cache tensor buffer matrix are discontinuous, and data of each segment of each output is directly or indirectly written to a corresponding segment of the last Q column vectors of the updated cache tensor buffer matrix according to its memory address.

15. The method of claim 10, wherein each cache tensor buffer is one row of the cache tensor buffer matrix.

16. The system of claim 12, wherein the processor reads a content of the first cache tensor buffer before shifting the starting memory address of the first cache tensor buffer, wherein the data of the first output is generated based on the content of the first cache tensor buffer and the Q input tokens of the LLM.

17. The system of claim 12, wherein the number of overhead space segments is the number Q of input tokens of the LLM, an address space of the Q overhead space segments is equal to Q×S, the number Q of overhead space segments is smaller than the cache size, S is a positive integer, a dimension of the first cache tensor buffer matrix is (R1, C×S), R1 is the row dimension, S is a stride size equal to one space segment, and R1 is a positive integer, and before shifting the starting address of the first cache tensor buffer for the first time, an address space of overhead space segments appended to the first cache tensor buffer is at least C×S.

18. The system of claim 17, wherein the starting memory address of the first cache tensor buffer is shifted by incrementing a first offset memory address equal to Q×S.

19. The system of claim 12, wherein the space segments of the last Q column vectors of the updated first cache tensor buffer matrix are discontinuous, and data of each segment of the first output is directly or indirectly to a corresponding segment of the last Q column vectors of the updated first cache tensor buffer matrix according to its memory address.

20. The system of claim 12, wherein the processor generates data of a second output according to Q input tokens of the LLM, and writes data of the second output into last Q column vectors of an updated second cache tensor buffer matrix, wherein a starting memory address of a second cache tensor buffer is shifted according to the number Q of input tokens of the LLM for updating the second cache tensor buffer, wherein the second cache tensor buffer forms a second cache tensor buffer matrix, the updated second cache tensor buffer forms the updated second cache tensor buffer matrix, wherein the second cache tensor buffer matrix comprises a plurality of space segments, the plurality of space segments have continuous memory addresses, a starting address of each row of the second cache tensor buffer matrix is continuous with an ending address of the previous row of the second cache tensor buffer matrix, and an starting memory address of the first cache tensor buffer matrix follows an end memory address of the second cache tensor buffer matrix.

* * * * *